United States Patent [19]

Carver

[11] 4,175,828
[45] Nov. 27, 1979

[54] COLLAPSIBLE STEREOSCOPIC VIEWER

[75] Inventor: Robert G. Carver, Ashland, Ohio

[73] Assignee: Creative Cartons of Ashland, Inc., Ashland, Ohio

[21] Appl. No.: 904,857

[22] Filed: May 11, 1978

[51] Int. Cl.² .................................... G02B 27/22
[52] U.S. Cl. ................................................ 350/140
[58] Field of Search ........................ 350/140; 40/365

[56] References Cited

U.S. PATENT DOCUMENTS

| | | | |
|---|---|---|---|
| 2,768,554 | 10/1956 | Leslie | 350/140 |
| 2,789,460 | 4/1957 | Kaufman | 350/140 |

Primary Examiner—Jon W. Henry
Attorney, Agent, or Firm—Squire, Sanders & Dempsey

[57] ABSTRACT

A collapsible stereoscopic viewer is comprised of a front wall having light-admitting openings therein; a rear wall assembly having coincident viewing apertures therein; top and bottom walls contiguous with the front and rear walls; and, side walls which include continuous extensions for forming a channel proximate the front wall whereby a stereoscopic film strip may be received therein. A film strip holder for retaining and accurately positioning a pair of photographic film strips is also disclosed. Blanks suitable for assembling both the viewer and film strip holder are similarly described.

21 Claims, 9 Drawing Figures

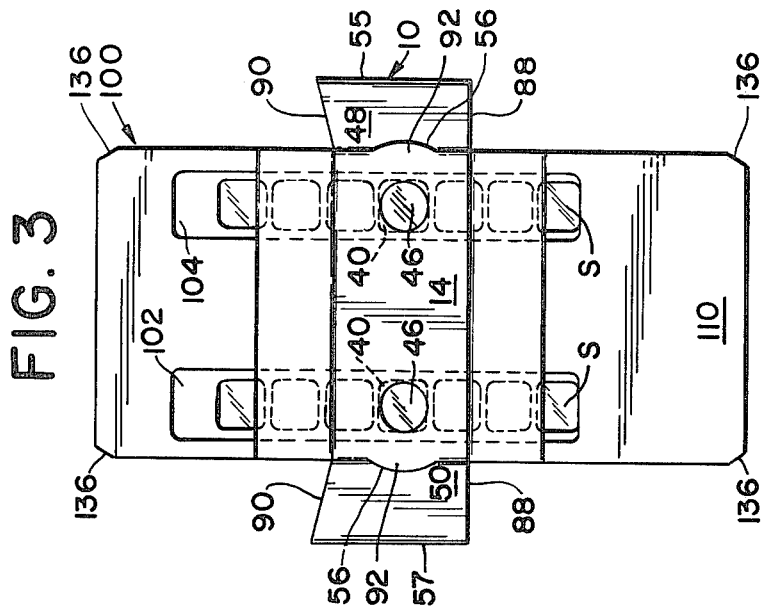
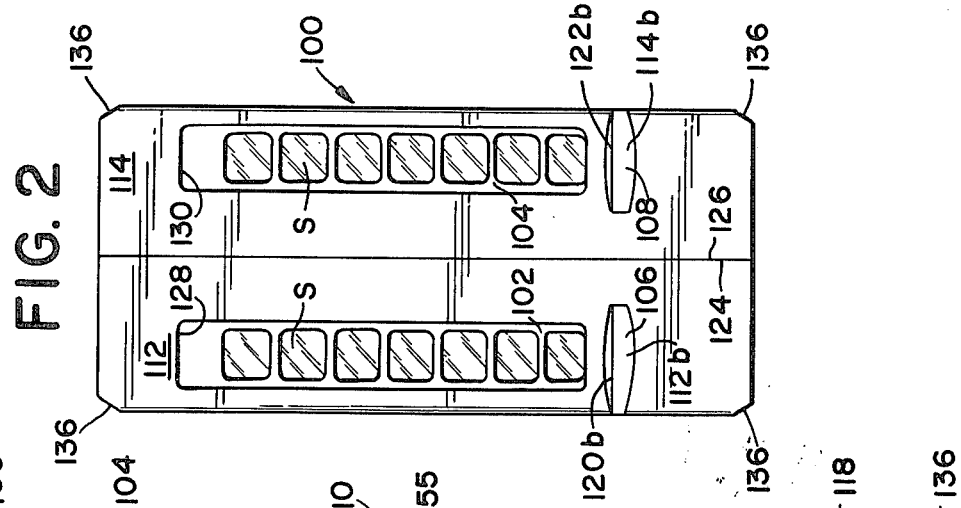
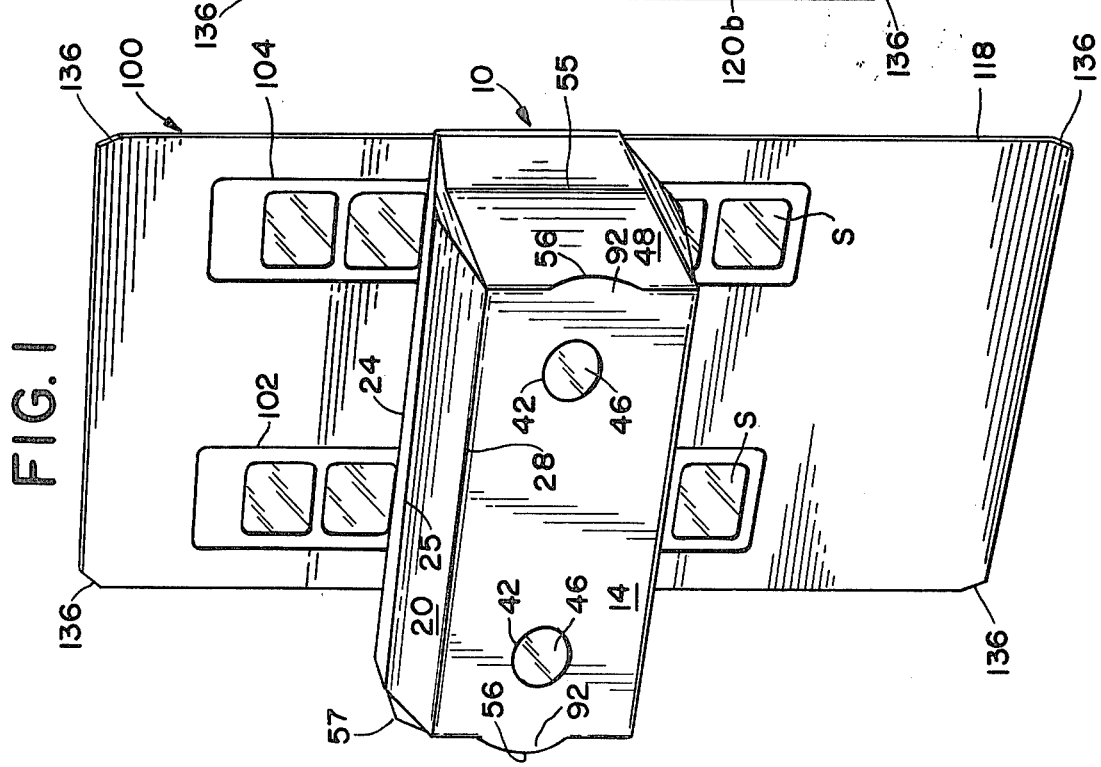

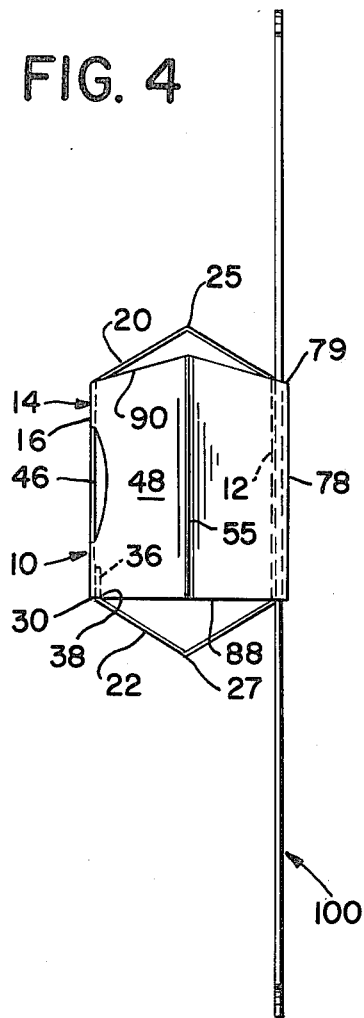
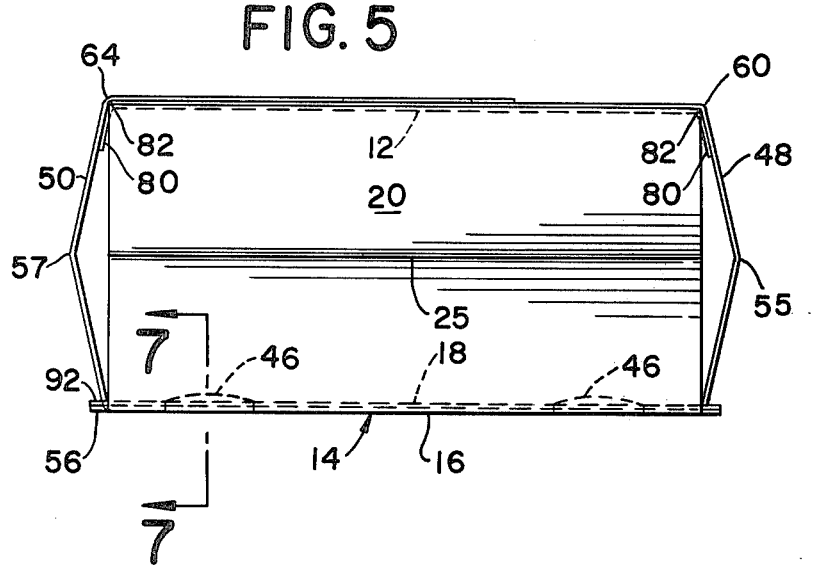
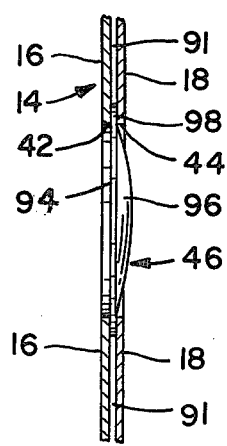
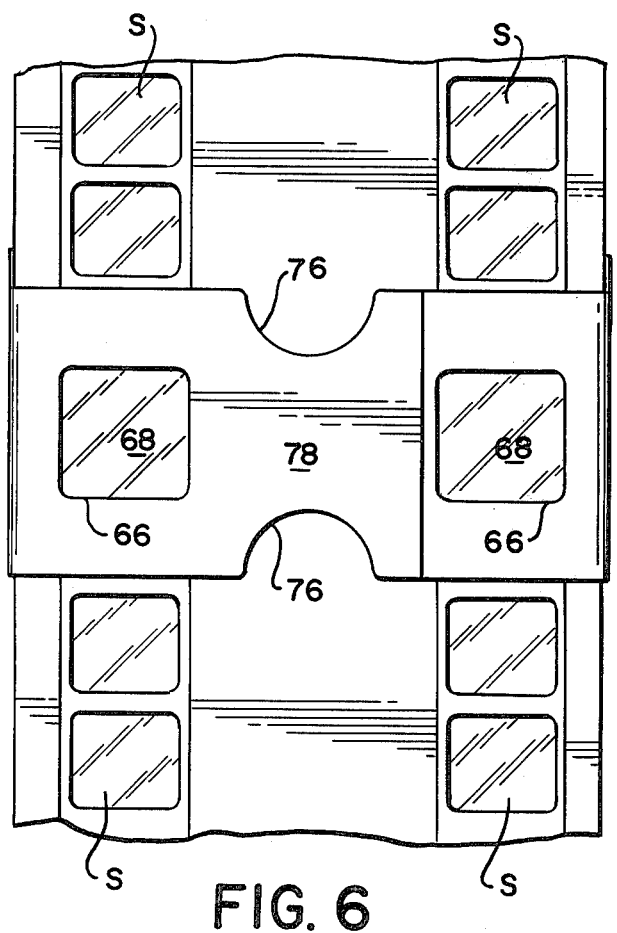

COLLAPSIBLE STEREOSCOPIC VIEWER

The present invention relates to stereoscopic photographic slide viewers and film strips therefor. More particularly, the present invention relates to disposable, collapsible stereoscopic photographic slide viewers.

The prior art recognizes various types of photographic slide viewers, including stereographic slide viewers, which may be folded or are otherwise collapsed. Conventionally, slide viewers include a front wall having a light-admitting opening for illuminating a photographic slide, and a rear wall having a viewing aperture which routinely houses a magnification lens. Further along these lines, collapsible viewers are similarly well known; certain designs being adapted for disposable use by virtue of construction from cardboard or like materials. Routinely, some means for insuring cooperation between an inserted film strip and the viewer itself are provided, often times in the form of a film strip receiving channel adjacent the front wall of the viewer. Light diffusing elements are conventionally incorporated into the light-admitting opening. Exemplary of these optical viewers are U.S. Pat. Nos. 2,789,460, 2,933,015, 2,986,830, 3,019,691, 3,386,194, 3,553,866, and 3,562,939.

While each of the aforementioned patent references discloses a viewer suitable for its intended purpose, various of the same require elaborate assembly to yield a finished viewer from the blank stage. Conversely, those which are of simpler assembly methodology fail to yield a finished article which possesses sufficient structural integrity to withstand any extended use. Yet other prior art designs require the attachments of an independent film-receiving channel to a completed optical viewer.

The prior art film strip elements for retaining and positioning the photographic slides for observation also suffer design difficiencies. When it is desired to employ stereographic slide systems, these inherent drawbacks are particularly troublesome due to the need for providing fairly accurate registration between the two photographic slides in order to properly obtain the stereo effect.

One conventional approach employs a pair of film strip blanks having longitudinal slots formed therein to receive the photographic film strip, as well as a number of registering apertures. The film strips are placed between the two sheets in coincidence with the longitudinal slots and the assembly is joined together with the apertures being used for proper orientation thereof. While the film strip holder, per se, may be viewed to be quite simple, the process of properly orienting and sealing the same is quite tedious and cumbersome.

Consequently, the need exists to provide a collapsible, preferably disposable, stereoscopic optical viewer which is of simple physical design, is easily assembled from the precurser blank, and which (although disposable) possesses sufficient structural integrity to allow for extended use. Similarly, the need exists to provide a cooperative film strip holder for this stereoscopic viewer which accurately secures and positions the dual photographic elements for stereoscopic viewing.

It is, therefore, a primary object of the present invention, to provide a stereoscopic optical viewer which is of simplified construction.

Another object of the present invention is to provide a collapsible, disposable stereoscopic optical viewer which possesses sufficient structural integrity to allow for extensive use.

Another object of the present invention is to provide a blank from which an optical viewer of the aforementioned character may be assembled.

Still another object of the present invention is to provide a stereographic film strip holder of improved design which positively and accurately positions and secures a pair of photographic film strips in order that the same be viewed in a stereographic mode.

It is yet another object of the present invention to provide a blank from which a stereographic film holder of the aforementioned character may be simply assembled.

It has now been determined that the foregoing objects may be realized, in accordance with the present invention, by providing a collapsible stereoscopic slide viewer comprising a front wall having a pair of light-admitting openings therein; a rear wall assembly having a pair of viewing apertures wherein the optical axes are coincident with the light-admitting openings in the front wall; magnification lenses in the apertures; top and bottom walls contiguous with the front and rear walls along transverse fold lines; side walls contiguous with the rear walls along discontinuous longitudinal fold lines; and, an integral film strip receiving channel outwardly proximate the front wall, which channel is formed from continuous extensions of each of the side walls. The rear wall assembly is, preferably, comprised of a pair of panel members, one of which is folded 180 degrees into engagement with the interior surface of the other in such a manner that a transverse pocket is formed.

Assembly of the optical viewer of the present invention from the blank is materially simplified by virtue of the design of the latter, whereby gluing or sealing operations are minimized while structural integrity is maximized. This is attributable, in part, to the manner in which the film receiving channel is formed from continuous extensions of the side walls of the viewer.

An improved film strip holder is provided in accordance with the present invention, which holder is comprised of a single-thickness rear wall with appropriate longitudinal slots formed therein, and a front wall with registering slots; the front wall being comprised of a pair of folded terminal members integral with the rear wall along longitudinal edges thereof. A film-receiving slot is provided by means of a double-thickness portion in the front wall of the holder, whereby the film strip may be inserted between the front and rear walls of the holder into positive and accurate alignment with the slots.

Further objects and advantages of the present invention will become apparent to the skilled artisan upon examination of the detailed description of the invention, taken in conjunction with the figures of drawings, wherein:

FIG. 1 is an isometric view of the optical viewer of the present invention and associated film strip holder;

FIG. 2 is a top plan view of a film strip holder of the present invention;

FIG. 3 is a rear elevation view of an optical viewer and film strip holder of the present invention;

FIG. 4 is a side elevation view of an optical viewer and film strip holder of the present invention;

FIG. 5 is a top elevation view of an optical viewer of the present invention;

FIG. 6 is a fragmentary front elevation view of the optical viewer of the present invention; and the associated film strip holder;

FIG. 7 is an exploded, fragmentary, sectional view of one viewing aperture and associated lens, taken substantially along the line 7—7 of FIG. 5;

Figure 8:
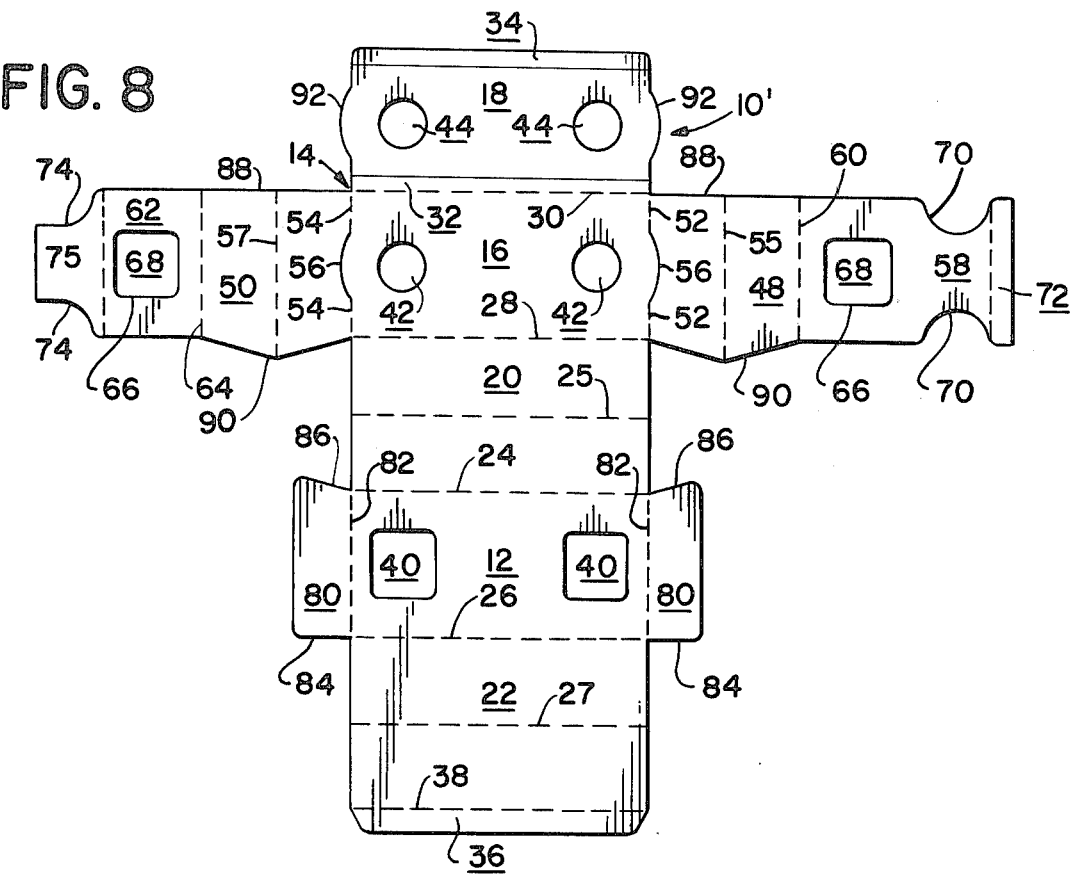
FIG. 8 is a top plan view of a blank from which the optical viewer of the present invention is assembled.

In order to more fully elucidate upon the various objects and advantages of the present invention, the same will now be described with reference to certain preferred embodiments thereof. However, the skilled artisan will appreciate that such a description of preferred embodiments is intended to be illustrative only, and is not to be deemed limitative.

A collapsible, stereoscopic viewer of the present invention is illustrated in FIG. 1 and is comprised of a viewer body 10 and associated film strip holder 100. For ease of description of the various elements comprising the viewer body 10, as well as a better appreciation of the cooperative nature of the same, reference is made to FIG. 8 which illustrates a blank 10' from which the viewer body 10 is assembled.

The viewer body 10 is comprised of a front wall 12 and a rear wall assembly, designated generally 14, the assembly 14 including a rear wall member 16 and a rear wall reinforcement element 18.

A top wall 20 and a bottom wall 22 are provided contiguously from opposing transverse edges of the front wall 12 along transverse fold lines 24 and 26, respectively. For ease of description, all lines parallel to the transverse fold lines 24 or 26 will be referred to herein as "transverse", while all lines perpendicular thereto will be described as "longitudinal", regardless of actual orientation. Each of the top and bottom walls is formed with a medial transverse fold lines, 25 and 27 respectively.

The rear wall assembly 14 is formed contiguous with top wall 20 about a transverse fold line 28; while the rear wall 16 and rear wall reinforcement element 18 are separated by a transverse score line 30. In this manner, the reinforcement element 18 is adapted to be folded 180 degrees into contact with the rear wall 16. To effectuate the placement of the two elements, glue strips 32 and 34 are provided on the reinforcement element 18.

A glue tab 36 is formed adjacent bottom wall 22, and is contiguous therewith about transverse fold line 38. The glue flap 36 is adapted to receive an adhesive on the obverse or bottom side of the blank shown in FIG. 8. In the assembled condition, such as shown in FIGS. 1 and 3-5, the glue flap 36 is designed to be adhered to the reinforced rear wall immediately adjacent the transverse score line 30 interiorly of the body 10.

A pair of light-admitting openings 40 are formed in the front wall 12, the dimensions thereof defining the field of view for the photographic slide inserted within the viewer, as described more fully hereinbelow. A pair of viewing apertures 42 are formed in rear wall 16, and a pair of corresponding apertures 44 are likewise formed in reinforcement element 18, the apertures 42 and 44 being in registration when the reinforcement element is folded and adhered to the wall 16 as described above. A pair of optical lenses 46 are disposed in the aperture system 42, 44, as best viewed in FIGS. 5 and 7. The viewing apertures 42, 44 have an optical axis coincidence with the corresponding light-admitting opening 40 in the front wall 12.

A pair of side walls 48 and 50 are contiguous with the rear wall element 16 about discontinuous longitudinal fold lines 52 and 54, respectively. A cut line 56, preferably arcuate, joins the discontinuous segments of each of these longitudinal fold lines 52 and 54, to aid in the placement of the lenses 46 within the aperture system 42, 44 as described below. Each of the side walls is formed with a medial, longitudinal fold line, 55 and 57, respectively.

A first channel forming panel 58 is contiguous with the first side wall 48 about longitudinal fold line 60; while a second and similar channel forming panel 62 is contiguous with the second side wall 50 about a longitudinal fold line 64. Each of the channel forming panels 58 and 62 are formed with a light-admitting opening 66 for registration with those light-admitting openings 40 in the front wall 12 when the viewer is assembled. The dimensions of each of the openings 66 are, preferably, somewhat larger than the corresponding dimensions of the openings 40. To aid in the proper illumination of the photographic slides to be viewed, each of the openings 66 has a light diffusing element 68 disposed therein. This light diffusing element 68 is, most preferably, a thin film of a standard light diffuser or similar translucent material.

The first channel forming panel 58 is formed with a pair of semi-circular notches 70 therein, and spaced along opposing transverse edges thereof. The notches 70 are somewhat centrally located between the opening 66 and the longitudinal edge of the panel 58 in order that a glue flap 72 is provided on the panel 58. A similar pair of notches 74 are formed at the terminal end of the second channel forming panel 62 to yield a tab 75. When the viewer is assembled, semi-circular recesses 76 are formed in a channel wall 78 by virtue of the flap 72 and tab 75, the wall comprised of the panels 58 and 62, as best viewed in FIG. 6. The recesses 76 aid in insertion and removal of film strip holder 100. The channel wall 78 is outwardly proximate front wall 12 to yield a film strip receiving channel 79.

A pair of glue flaps 80 are formed contiguous with the front wall 12 about longitudinal fold lines 82. The glue flaps 80 are designed to receive a quantity of adhesive on the obverse side of the blank shown in FIG. 8; the flaps 80 being folded for attachment to the corresponding side walls 48 and 50 (i.e., right-to-right and left-to-left) immediately adjacent the longitudinal fold lines 60 and 64 interiorly of the body 10, as best viewed in FIG. 5.

As shown in FIG. 8, each of the glue flaps 80 has a bottom edge 84 and a top edge 86; the former best described as straight and the latter best described as angular. Similarly, each of the side walls 48 and 50 are formed with straight edges 88, corresponding to the bottom edge when the viewer body is assembled, and outwardly angled edges 90 corresponding with the top edges when the viewer body is assembled. The angular edges 86 of each glue flap 80 are designed to cooperate with the outwardly angular edges 90 of the side walls 48 and 50, whereby the pitched cross-sectional profile of the upper side of the viewer body 10, best viewed in FIG. 4, is formed. The assembled viewer thus assumes the configuration shown in FIGS. 1, 4 and 5 where the top, bottom and side walls are all pitched outwardly, whereby the viewer walls are relatively displaceable from the shape illustrated in order to provide a focusing feature as described hereinbelow.

As noted above, the rear wall assembly 14 is comprised of the rear wall element 16 and cooperative reinforcing wall 18 adhered thereto. Because of the placement of the adhesive zones 32 and 34, a medial transverse pocket 91 is formed in the zone bounded by the adhesive zones, which pocket is coincident with the aperture system 42, 44. Access to this pocket, in order to insert the lenses 46, is achieved via arcuate cut 56, with corresponding arcuate tabs 92 being formed outwardly along the longitudinal edges of the reinforcement element 18 in order to facilitate the placement of the lenses 46 within the apertures.

As best viewed in FIG. 7, each lense 46 has a generally flat outer face 94 and an opposing concave face 96. An annular ridge 98 joins the two faces and provides a retaining flange means between the rear wall assembly elements 16 and 18.

Assembly of the viewer body 10 from the blank 10', shown in FIG. 8 is very simply achieved. The blank 10', most preferably formed from a cardboard material, is easily die stamped to the shape shown in FIG. 8, and all of the cut, score and fold lines are placed therein simultaneously. Preferably, each of the linear and arcuate joining members may be cut, or embossed from a single side: that is, each of the transverse and linear fold lines has the same lateral configuration, each of the fold lines in FIG. 8 projecting out of the surface of the page, whereby outwardly directed fold lines result.

Once the blank 10' is cut to the configuration shown, adhesive is applied to the zones 32 and 34, the obverse sides of the glue flaps 36 and 80, and the zone 72. The reinforcing element 18 is then folded 180 degrees about score line 30 into reinforcing engagement with rear wall element 16. The glue flap 36 is then brought into contact with the reinforced rear wall assembly 14 adjacent the score line 30 interiorly of the body 10. Next, the side wall 50 is rotated 90 degrees with respect to the reinforced rear wall, and into contact with the obverse side of the corresponding glue tab 80, with the longitudinal fold line 82 in substantial registration with longitudinal fold line 64. Next, the side wall 48 is similarly folded and attached to the corresponding glue tab 80 with the fold lines 82 and 60 in registration. Finally, the glue zone 72 is adhered to the tab 75 of panel 62. Accordingly, the channel wall 78 can be seen to be comprised of the joined channel forming panels 58 and 62, while the semi-circular recesses 76 result from the coincidence of the semi-circular notches 70 in panel 58 and the arcuate notches 74 in the panel 62.

A film strip holder 100, employed in conjunction with the optical viewer described above, is shown in FIG. 2. As is conventional with stereoscopic slide viewers, the film strip holder 100 includes a pair of longitudinal slots 102, 104 for receiving photographic film strips and accurately positioning the same. The individual film strips are inserted within the slots 102, 104 by means of corresponding slits 106, 108, respectively, located beneath each of these longitudinal slots.

Figure 9:
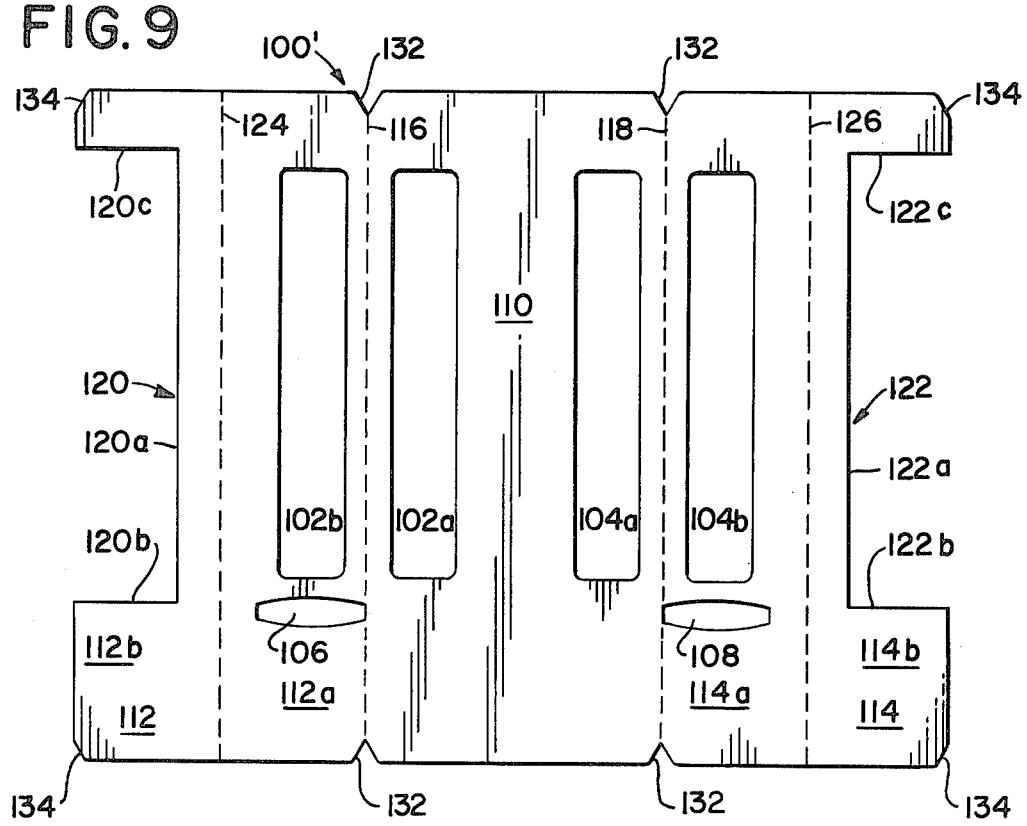
FIG. 9 is a top plan view of a blank from which the film strip holder of the present invention is assembled.

For a proper understanding of the manner of construction of film holder 100, as well as the cooperation of the various elements comprising the holder, reference is made to FIG. 9 which illustrates a blank 100' from which the holder is assembled. The blank 100' is comprised of a rear wall forming panel 110 having a pair of longitudinal slots 102a and 104a formed therein; as well as a pair of front wall forming panels 112 and 114 adjacent therewith about longitudinal fold lines 116 and 118, respectively. Front wall forming panel 112 is formed with a longitudinal slot 102b, for cooperation with slot 102a as described more fully hereinbelow, and transverse slit 106. Likewise, panel 114 includes longitudinal slot 104b and transverse slit 108. Each front wall forming panel also has formed therein a marginal, rectangular notch 120 in panel 112, and 122 in panel 114. Longitudinal fold lines 124 and 126 divide each of the front wall forming panels into two segments, e.g., 112a and 112b.

Dimensionally, each panel 110, 112 and 114 has the same overall measurements. Similarly, each of the longitudinal slots 102a, 102b, 104a and 104b are of substantially identical dimensions. And, while each of the notches 120 and 122 has the same dimensions, the length and width thereof, e.g. 120a and 120b, respectively, are both larger than the length and width dimensions of the longitudinal slots 102,104. Lastly, each of the longitudinal fold lines 124 and 126 divides the respective panels into two equal widths.

In order to assemble the film strip holder 100 from the blank 100', adhesive is applied to the faces of each of the panel segments 112b and 114b. These segments are then folded 180 degrees about fold lines 124 and 126 into contact with the faces 112a and 114a, whereby the pair of reinforced half-panels 112 and 114 are formed. Because of the dimensioning of the notches 120 and 122, each of the slots 106 and 108 will be partially covered, as best viewed in FIG. 2.

The reinforced half-panels with the obverse of each of the segments 112b and 114b now in an upward position, have adhesive applied on these top surfaces. Subsequently, each of the half-panels is then rotated 180 degrees about the fold lines 116 and 118 into engagement with the face of the rear wall forming panel 110, to yield a completed holder 100 as shown in FIG. 2.

The completed holder 100 of FIG. 2 is thus provided with longitudinal pockets 128, 130 surrounding the longitudinal channels 102 and 104 since the notches 120 and 122 are oversized with respect to these slots. Access to these longitudinal pockets is made via the slits 106 and 108, whereby a film strip may be easily inserted into the holder. Given a pair of identical film strips in order to achieve the stereoscopic effect, the upper edges 120c and 122c of the notches 120 and 122 will provide a stop in order that each film strip is properly registered within the pocket surrounding the slots 102 and 104.

In order to facilitate the insertion of the holder 100 within the channel defined between the front wall 12 and the channel wall 78, the blank 100' is preferably provided with four inwardly directed notches 132 as shown in FIG. 9, the notches corresponding with the fold lines 116 and 118, while the corners 134 are also rounded. In this manner, when the blank is folded into a completed configuration, rounded or tapered corners 136 are formed, as best viewed in FIGS. 1-3.

For ease of transportation and/or marketing, the viewer 10 and film strip holder can conveniently be packaged in the form of blanks 10' and 100'; albeit they might be pre-assembled since the same are of generally planor configuration in both conditions insofar as the viewer is collapsible. The various areas of the blank adapted to receive a quantity of glue might, optionally, be pre-pasted with a pressure-sensitive adhesive provided with a suitable protective covering if supplied in the form of blanks.

Further along these lines, it is preferable to package the blank 10' with the light diffusing elements 68 adhered thereto. However, the magnification lenses 46 may remain loosely packaged, for ultimate insertion within the transverse pocket 91 by the user upon assembly of the viewer, the lenses 46 being firmly retained by virtue of flanges 98.

Regardless of the manner in which the components are packaged, once assembled into a completed viewer 10, the user may easily insert a completed film strip holder 100 into channel 79 in order to view the photographic slides S. The dimensions of light-admitting openings 40 are approximately the same as standard frame dimensions for a photographic slide and, thus, substantially define the field of view. When the viewer is directed toward a source of light, diffuser elements 68 provide generally uniform illumination of the photographic image, while magnification lenses 46 resolve that image. Focusing the viewer is simply achieved by applying an inwardly directed force on medial transverse fold lines 25 and 27, whereby the distance between the front wall 12 and rear wall assembly 14 is altered.

The viewer of the present invention is, accordingly, of simplified construction when compared with prior art devices. Nonetheless, it possesses sufficient structural integrity to allow for extensive use, notwithstanding the fact that the same may be fabricated from cardboard or the like should it be designed for disposable use. Obviously, for more permanent applications, the viewer and associated film strip holder might be made from a light-weight plastic.

While the invention has now been described with reference to certain preferred embodiments, the skilled artisan will recognize the various substitutions, changes, modifications and omissions may be made without departing from the spirit thereof. Accordingly, it is intended that the scope of the invention be limited solely by that of the following claims.

What is claim is:

1. A collapsible stereoscopic viewer for viewing photographic slides, said viewer comprising:
   (a) a front wall having a pair of light-admitting openings therein;
   (b) a reinforced rear wall assembly having a pair of viewing apertures therein with optical axes coincident with said light-admitting openings;
   (c) a pair of magnification lenses disposed in said apertures;
   (d) a top wall contiguous with both of said front wall and said rear wall assembly along a pair of spaced, transverse fold lines;
   (e) a bottom wall contiguous with said front wall along a transverse fold line and adhered to said rear wall assembly;
   (f) a pair of opposing side walls contiguous with said rear wall assembly along a pair of spaced longitudinal fold lines;
   (g) a pair of glue flaps contiguous with said front wall along a pair of spaced longitudinal fold lines, said glue flaps being adhered to portions of said side walls; and,
   (h) a film strip receiving channel outwardly proximate said front wall, said channel including:
      (i) a channel wall comprised of a pair of continuous extensions of said side walls in partially overlapping engagement;
      (ii) a pair of light-admitting openings in said channel wall coincident with said optical axes; and,
      (iii) light-diffusing elements disposed in each of said openings in said channel wall.

2. The viewer of claim 1, wherein said reinforced rear wall assembly further comprises a transverse pocket in registration with said viewing apertures, said magnification lenses being restrained within said transverse pocket.

3. The viewer of claim 2, wherein said rear wall assembly comprises a rear wall member and a rear wall reinforcing member contiguous therewith along a transverse score line and adhesively secured thereto on the interior face thereof, the area of adhesive defining the transverse boundaries of said transverse pocket.

4. The viewer of claim 3, wherein said side walls are contiguous with said rear wall member about discontinuous longitudinal fold lines, a longitudinal cut line joining the discontinuous segments thereof and defining means for access to said transverse pocket.

5. The viewer of claim 3, wherein said magnification lenses include a peripheral annular flange projecting outwardly from said viewing apertures into said transverse pocket.

6. The viewer of claim 3, wherein:
   (a) each of said top and bottom walls has an outwardly directed transverse, medial fold line; and,
   (b) each of said side walls has an outwardly directed longitudinal fold line; whereby a compression force applied to said viewer will effect a relative dimensional displacement between said front wall and said rear wall assembly.

7. The viewer of claim 4, wherein said cut line is an outwardly directed arcuate cut line and said rear wall reinforcing member includes a pair of outwardly directed arcuate tabs for cooperative engagement therewith.

8. The viewer of claim 6, wherein:
   (a) a glue flap is contiguous with said bottom wall along a transverse fold line which lies in registration with said transverse score line interiorly of said viewer; and
   (b) the longitudinal fold lines separating said pair of glue flaps and said front wall lie in registration with corresponding longitudinal fold lines separating said side walls and said pair of continuous extensions interiorly of said viewer.

9. The viewer of claim 8, wherein said channel wall includes a pair of opposing, arcuate notches along the transverse edges thereof intermediate the light-admitting openings therein.

10. A blank for forming a collapsible stereoscopic viewer, comprising:
   (a) a bottom wall forming panel having a glue flap contiguous therewith along a transverse fold line;
   (b) a front wall forming panel contiguous with said bottom wall forming panel along a transverse fold line, and including a pair of light-admitting openings therein;
   (c) a pair of glue flaps contiguous with said front wall forming panel along longitudinal fold lines;
   (d) a top wall forming panel contiguous with said front wall forming panel along a transverse fold line;
   (e) a reinforced rear wall assembly forming panel contiguous with said top wall forming panel along a transverse fold line and including viewing apertures therein for optical registration with the light-admitting openings in said front wall forming panel;

(f) a pair of side wall forming panels contiguous with said rear wall assembly forming panel about spaced longitudinal fold lines; and, (g) a pair of channel wall forming panels contiguous with said side wall forming panels along longitudinal fold lines, and including light-admitting openings therein for optical registration with the light-admitting openings in said front wall.

11. The blank of claim 10, wherein said rear wall assembly forming panel comprises a rear wall member forming panel adjacent said top wall forming panel and a rear wall reinforcing member forming panel contiguous therewith along a transverse score line.

12. The blank of claim 11, wherein each of said rear wall forming members includes a pair of viewing apertures.

13. The blank of claim 12, wherein each of said top and said bottom wall forming panels includes a medial transverse fold line and each of said side wall forming panels includes a medial longitudinal fold line.

14. The blank of claim 13, wherein a first of said channel wall forming panels has a pair of semi-circular notches formed along opposing transverse edges thereof and the second of said channel wall forming panels has a pair of arcuate notches at the terminal corners thereof.

15. The blank of claim 11, wherein said side wall forming panels are adjacent said rear wall member forming panel along discontinuous fold lines.

16. The blank of claim 15, wherein a cut line joins the discontinuous segments of said fold line.

17. The blank of claim 16, wherein said cut line is an outwardly directed arcuate line.

18. The blank of claim 17, wherein said rear wall reinforcing member forming panel includes a pair of outwardly directed tabs.

19. The blank of claim 13, wherein each of said fold lines is an outwardly directed fold line.

20. In a stereoscopic viewer having front, rear, side, top and bottom walls joined in a collapsible configuration and a film strip receiving channel outwardly proximate said front wall, said channel including a channel forming wall spaced from said front wall, the improvement comprising a pair of contiguous extensions of said side walls jointed in partially overlapping engagement to provide said channel forming wall.

21. In a blank for a collapsible stereoscopic viewer, having panels for forming top, bottom, side, front, rear and channel walls, the improvement comprising a pair of channel wall forming panels contiguous with the side wall forming panels along longitudinal fold lines.

* * * * *

UNITED STATES PATENT AND TRADEMARK OFFICE
CERTIFICATE OF CORRECTION

PATENT NO. : 4,175,828
DATED : November 27, 1979
INVENTOR(S) : Robert G. Carver

It is certified that error appears in the above-identified patent and that said Letters Patent are hereby corrected as shown below:

Claim 20, Column 10, Line 21, please change "jointed" to read --joined--.

Signed and Sealed this

Twenty-eighth Day of October 1980

[SEAL]

Attest:

SIDNEY A. DIAMOND

Attesting Officer

Commissioner of Patents and Trademarks